C. HAMANN.
CALCULATING MACHINE.
APPLICATION FILED APR. 20, 1912.
1,221,318.
Patented Apr. 3, 1917.
12 SHEETS—SHEET 1.
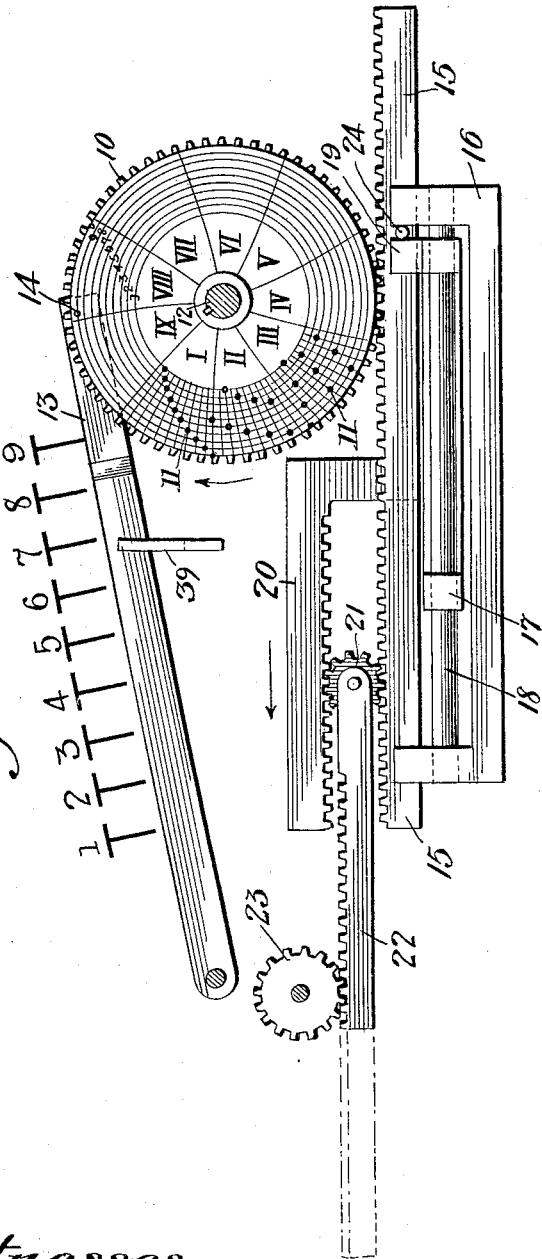
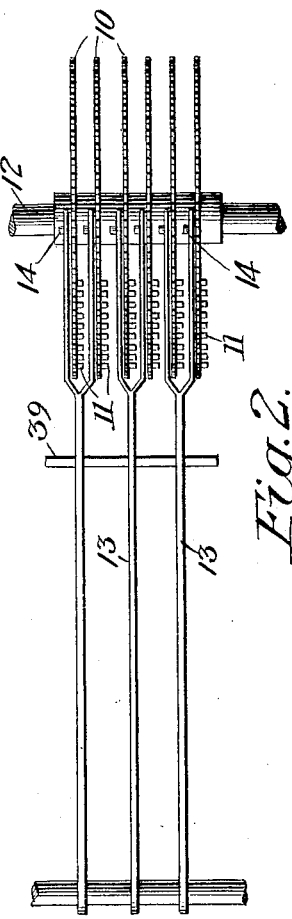
Witnesses.
Harry Pickett.
C. B. Hall.
Inventor:
Christel Hamann.
By Willis Fowler.
Attorney

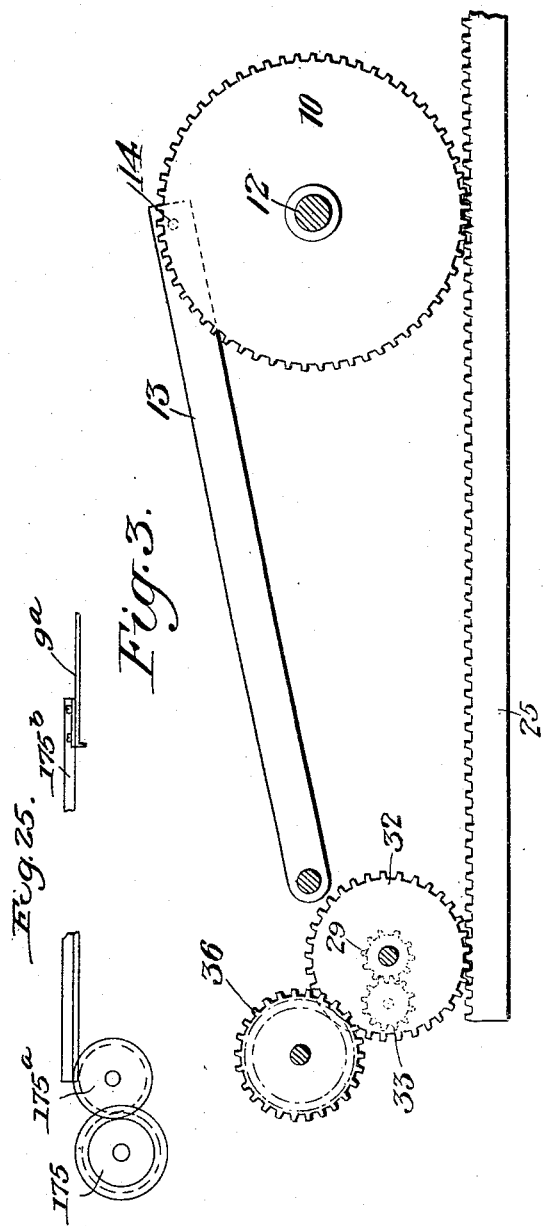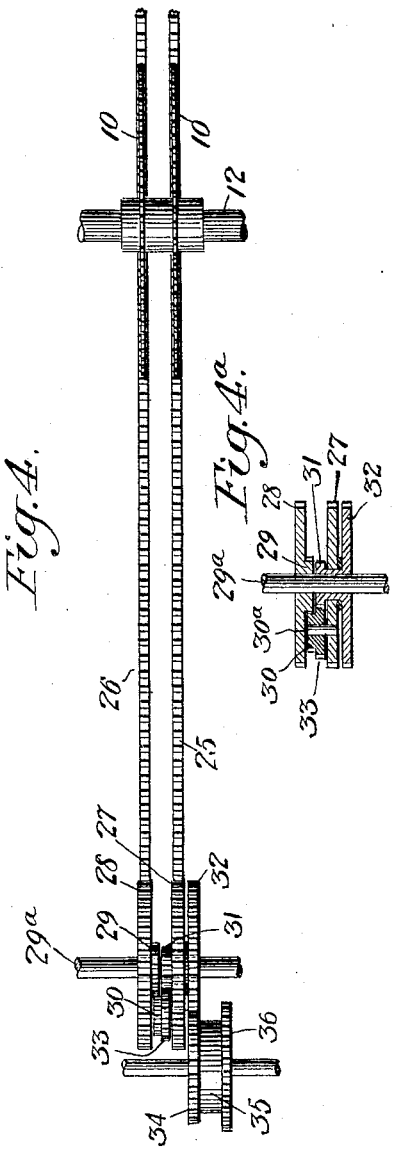

C. HAMANN.
CALCULATING MACHINE.
APPLICATION FILED APR. 20, 1912.
1,221,318.
Patented Apr. 3, 1917.
12 SHEETS—SHEET 3.
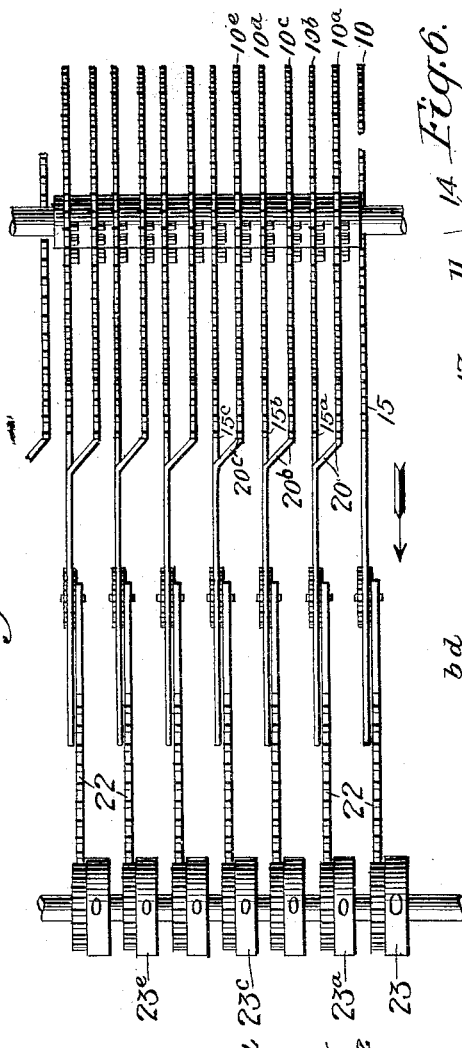
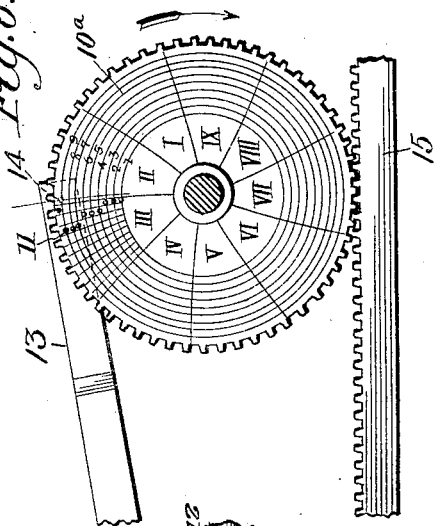
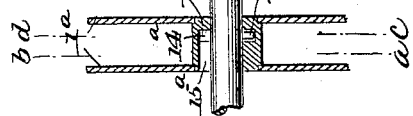
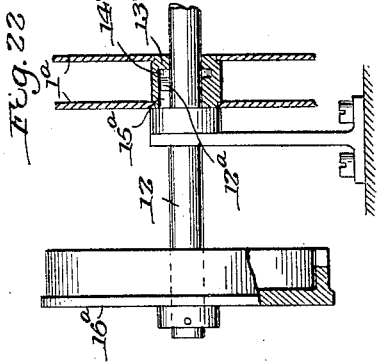
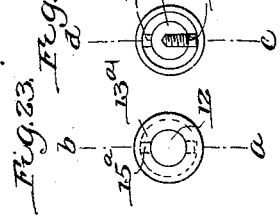

C. HAMANN.
CALCULATING MACHINE.
APPLICATION FILED APR. 20, 1912.
1,221,318.
Patented Apr. 3, 1917.
12 SHEETS—SHEET 4.
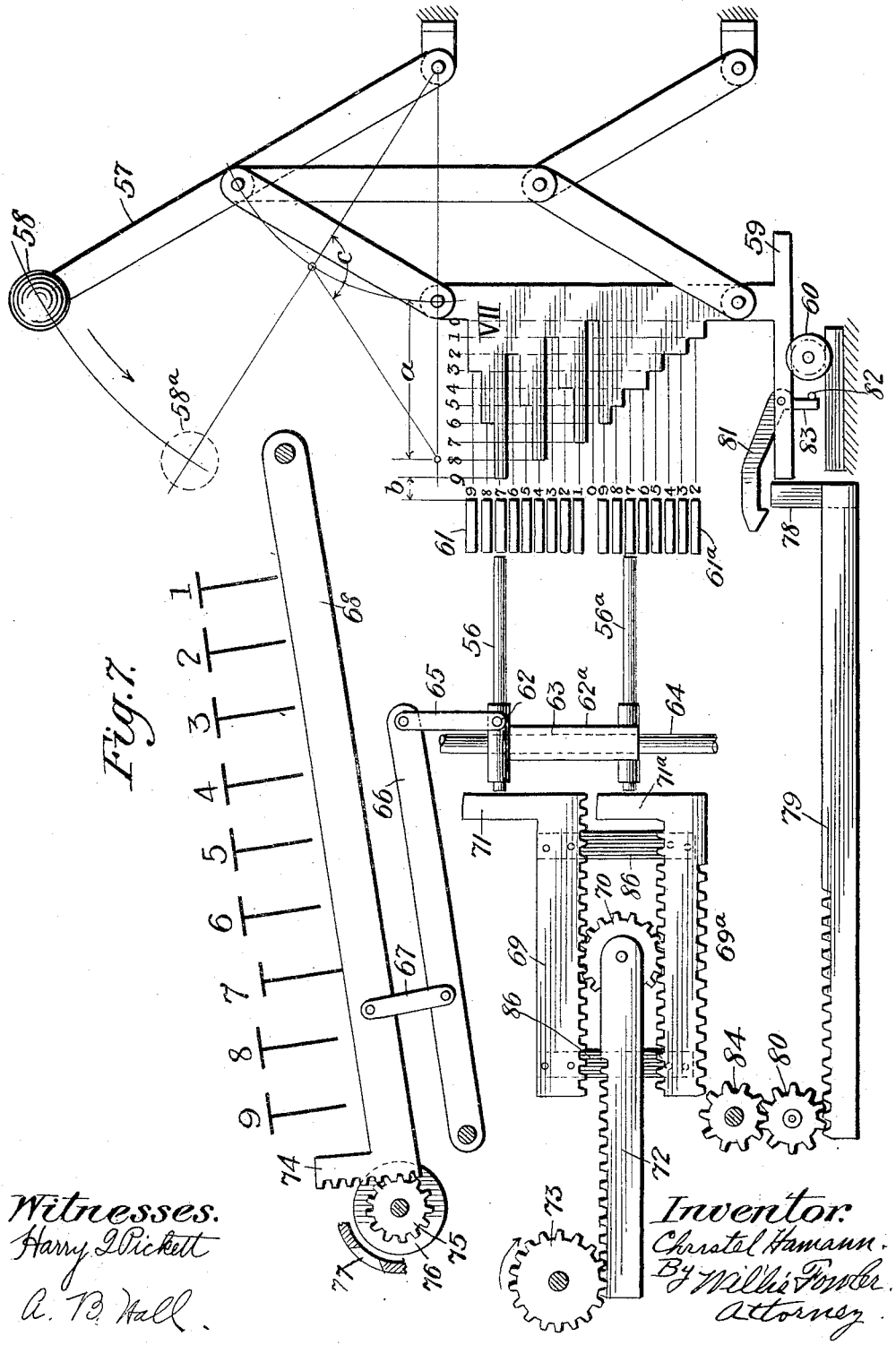

C. HAMANN.
CALCULATING MACHINE.
APPLICATION FILED APR. 20, 1912.
1,221,318.
Patented Apr. 3, 1917.
12 SHEETS—SHEET 5.
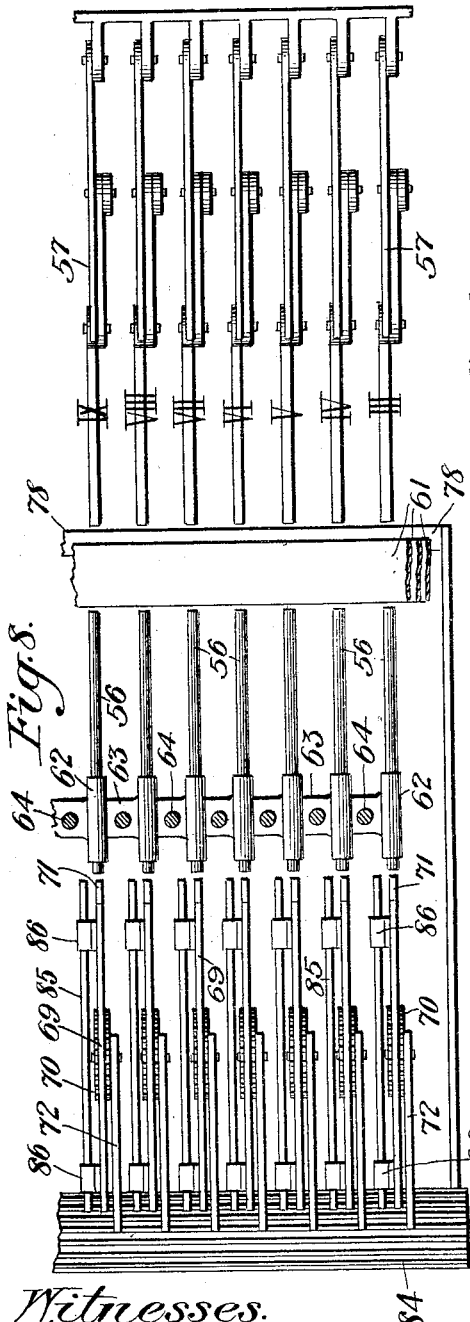
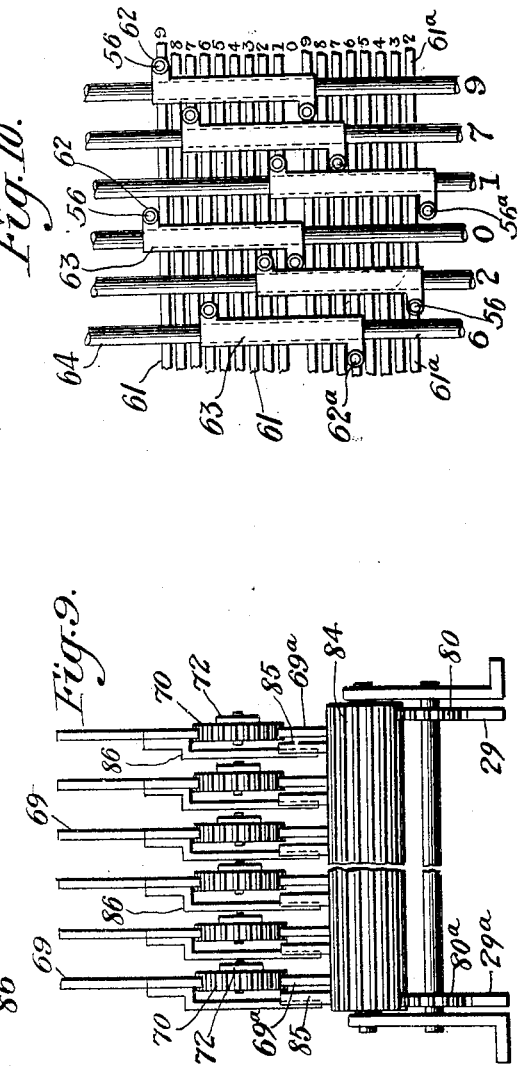

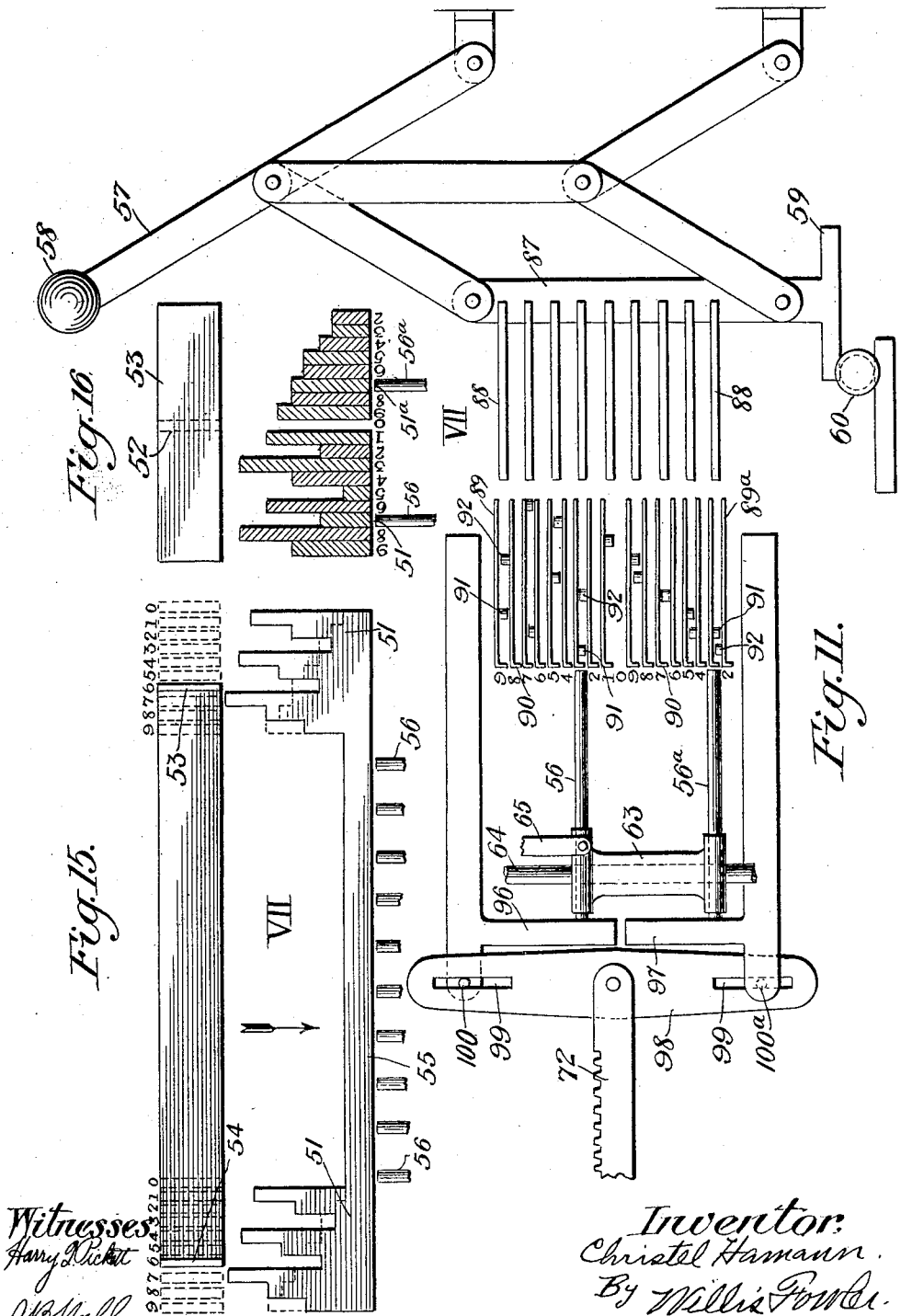

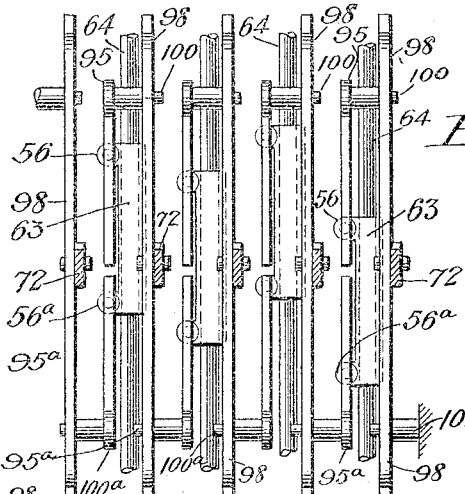
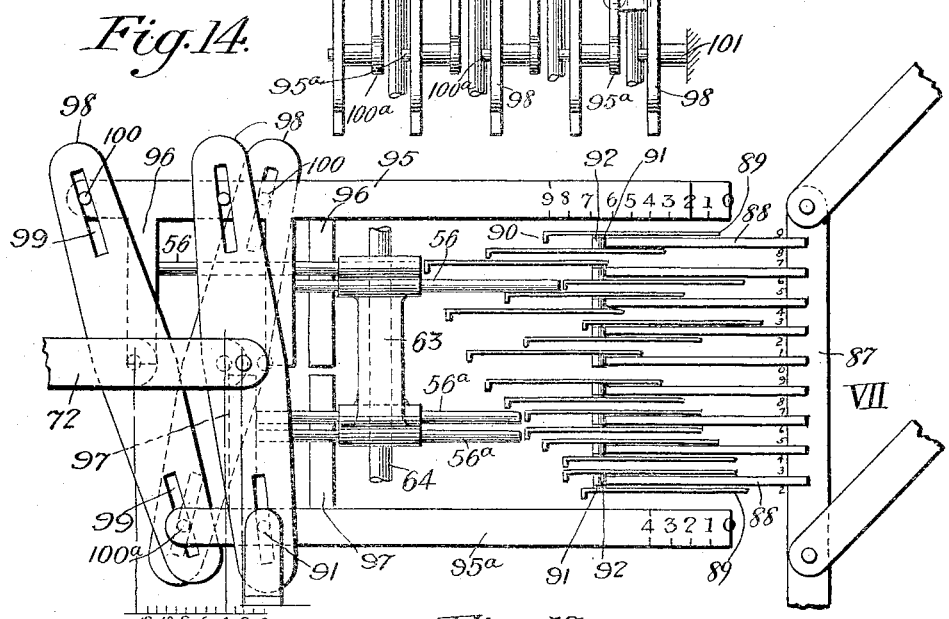
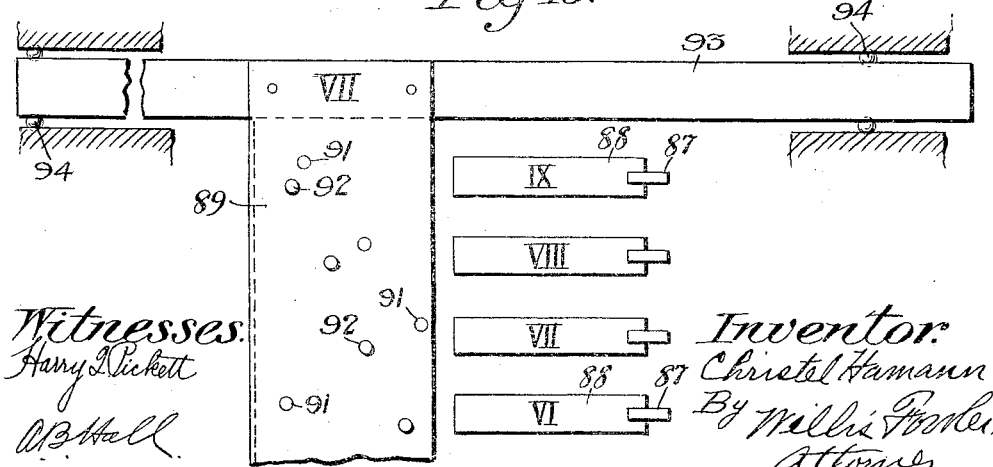

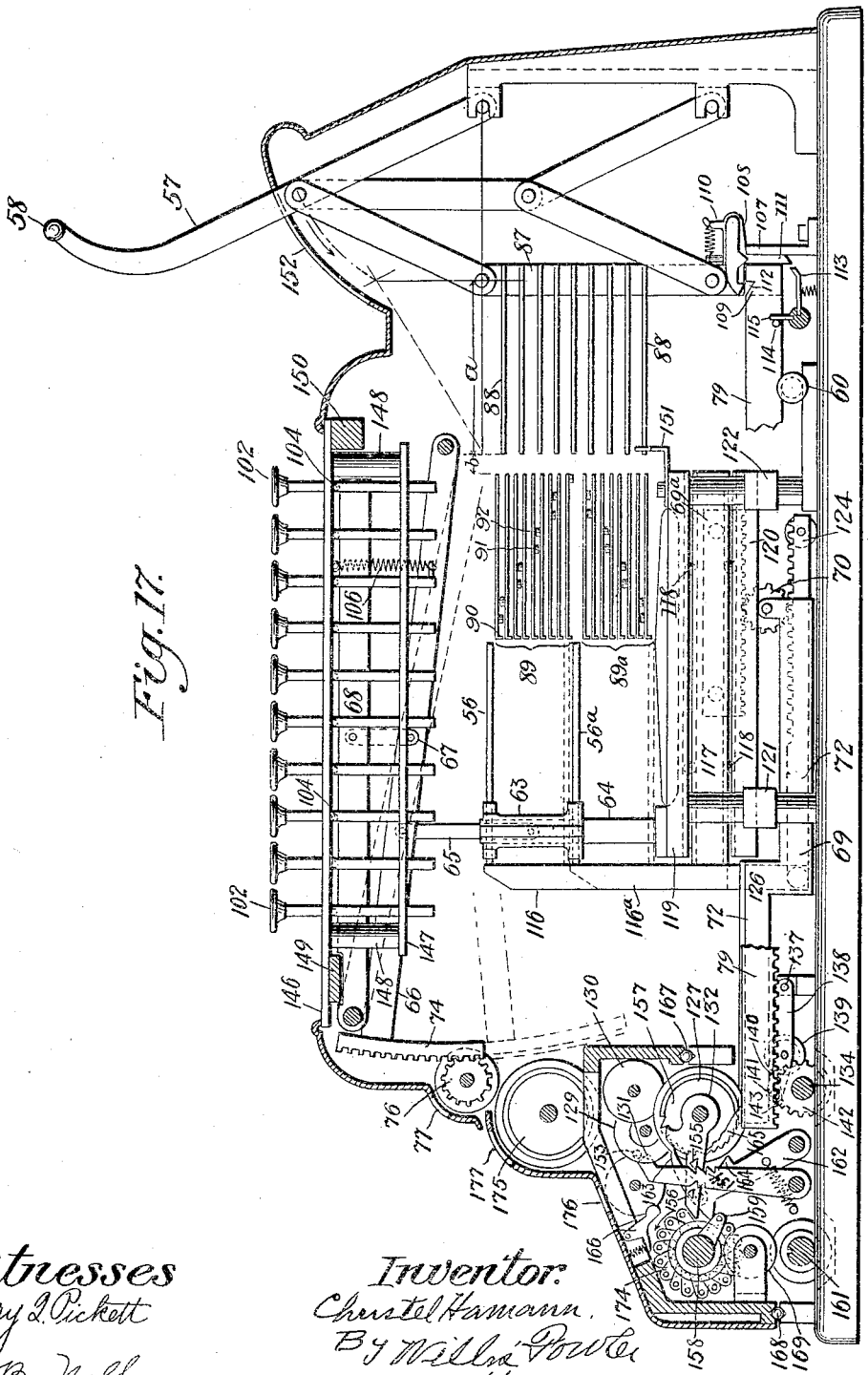

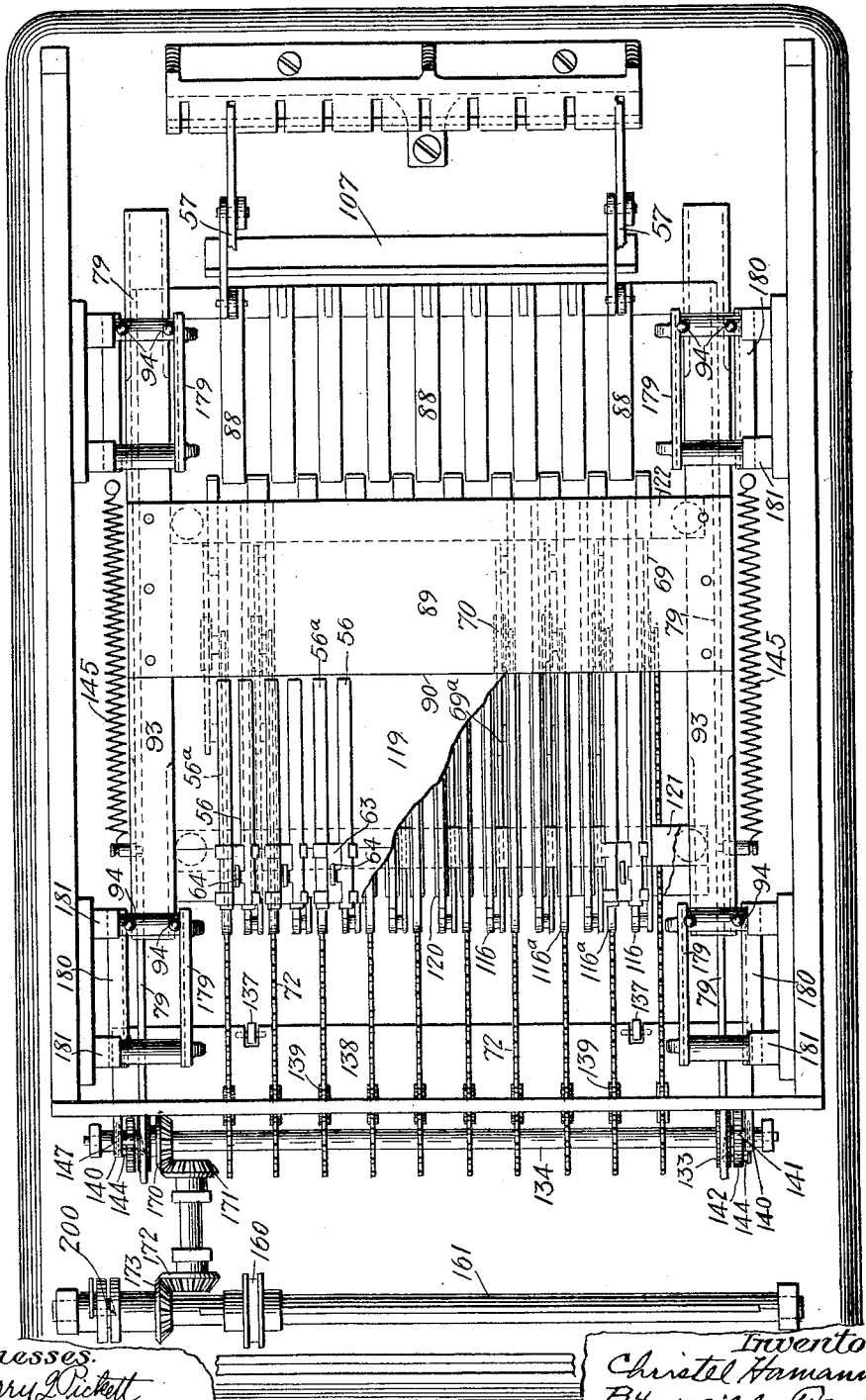

C. HAMANN.
CALCULATING MACHINE.
APPLICATION FILED APR. 20, 1912.

1,221,318.

Patented Apr. 3, 1917.
12 SHEETS—SHEET 10.

Witnesses.
Harry J. Pickett
A. B. Hall

Inventor:
Christel Hamann.
By Willis Fowler.
Attorney.

C. HAMANN.
CALCULATING MACHINE.
APPLICATION FILED APR. 20, 1912.
1,221,318.
Patented Apr. 3, 1917.
12 SHEETS—SHEET 11.
Fig. 20.
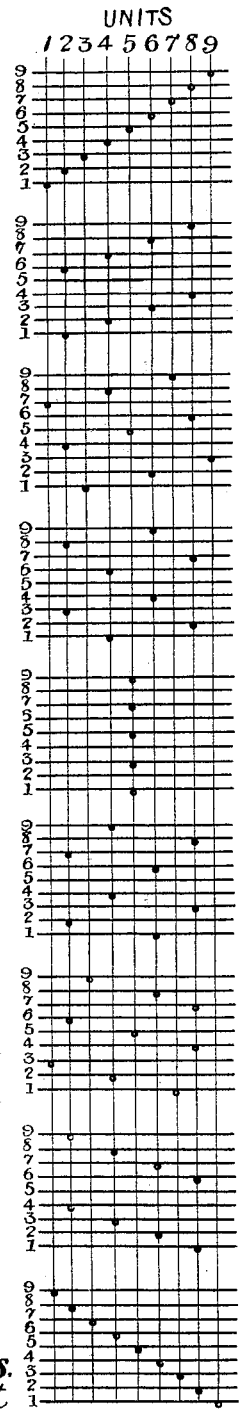
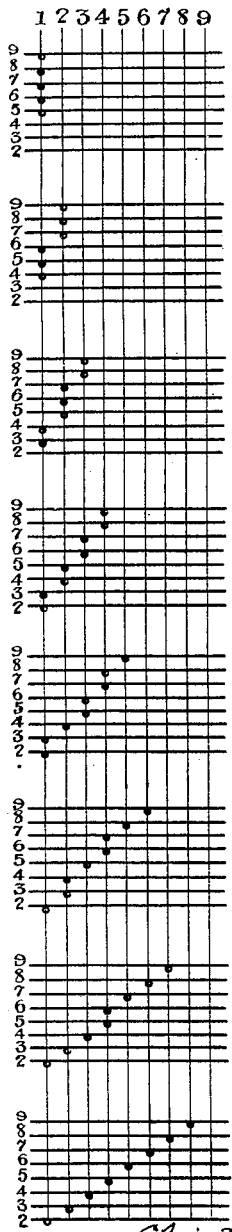

C. HAMANN.
CALCULATING MACHINE.
APPLICATION FILED APR. 20, 1912.
1,221,318.
Patented Apr. 3, 1917.
12 SHEETS—SHEET 12.
Fig. 21.
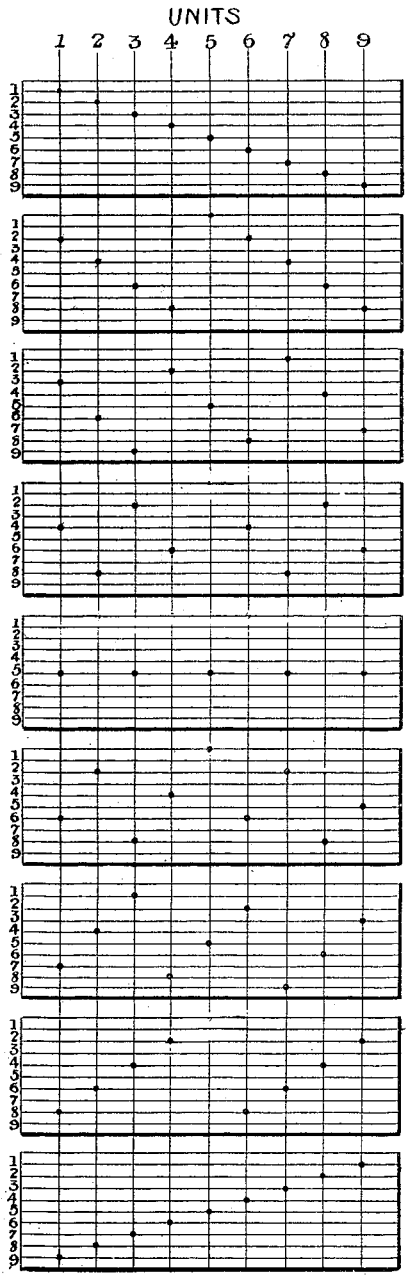
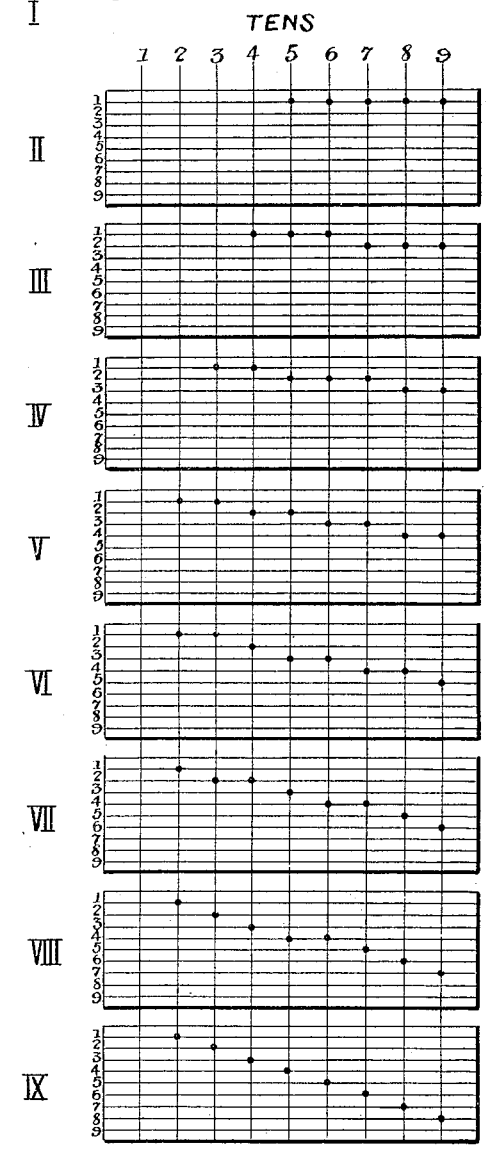
Witnesses.
Harry L. Pickett
A. B. Hall
Inventor:
Christel Hamann
By Willis Fowler
Attorney.

UNITED STATES PATENT OFFICE.

CHRISTEL HAMANN, OF FRIEDENAU, NEAR BERLIN, GERMANY, ASSIGNOR TO THE CH. HAMANN, MATHEMATISCHE MECHANISCHES INSTITUT G. M. B. H., OF BERLIN, GERMANY.

CALCULATING-MACHINE.

1,221,318. Specification of Letters Patent. Patented Apr. 3, 1917.

Application filed April 20, 1912. Serial No. 691,991.

*To all whom it may concern:*

Be it known that I, CHRISTEL HAMANN, a subject of the Emperor of Germany, residing at Friedenau, near Berlin, Germany, have invented certain new and useful Improvements in Calculating-Machines; and I do hereby declare the following to be a full, clear, and exact description of the invention, such as will enable others skilled in the art to which it appertains to make and use the same.

The present invention relates to calculating machines for mechanically performing multiplication, division, addition or subtraction of amounts having any number and sequence of digits, and more specifically to a machine of this kind well adapted to perform the multiplication of such amounts.

The product of any two factors may be obtained either by adding the multiplicand as many times in proper denominational order as there are units in each digit of the multiplier, or by adding the separate products of each multiplicand digit and each multiplier digit in proper denominational order. The invention herein disclosed operates on the latter principle, generally called the multiplication principle in contradistinction to the addition principle.

In prior calculating machines especially adapted for multiplication and using the multiplication principle, the units and tens of the separate products of the multiplicand and multiplier digits are registered successively on the result indicators, and in many of such machines the counter is shifted in denomination to effect indentation of the results in the period between the registration of the units and tens. Furthermore, in all machines of this kind with which I am familiar, a separate driving operation is required after each digit of the multiplier is set up in the machine.

One object of this invention is to provide a differential gearing in the transmitting mechanism between the actuating devices and the counter for simultaneously registering the units and tens of the products of the separate digits of the factors on the counter, whereby the necessity for successive registrations is eliminated.

Another object is to provide a calculating machine having the characteristic that the partial products of the multiplicand and each multiplier digit is added on the result indicators when that multiplier digit is set up in the machine, whereby the complete product of the two factors is obtained as soon as the two factors are completely set up without any subsequent driving operation after any one or all the digits of the multiplier are set up.

Other desirable objects in construction and operation will be apparent from the following description and will be specifically pointed out in the appended claims.

Two modifications within my invention are disclosed herein, the first requiring a driving operation after each digit of the multiplier is set up, and the second modification requiring only that the digits be set up to obtain their product.

In the accompanying drawings, illustrating these two modifications,

Figure 1 is a diagrammatic view in side elevation of the first modification referred to;

Fig. 2 is a plan view of that modification;

Fig. 3 is a side view of a variation of that modification;

Fig. 4 is a plan view of Fig. 3;

Figure 19:
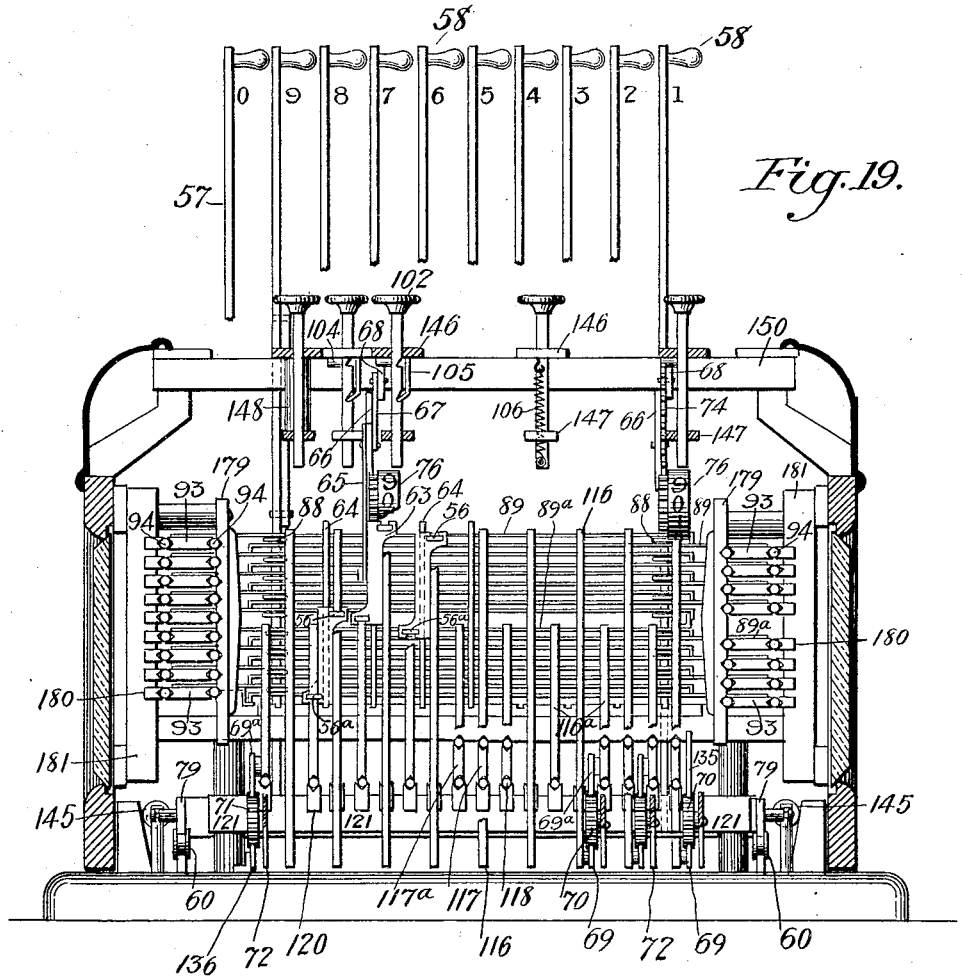

Fig. 4ᵃ is a sectional view of the planetary gearing shown in Figs. 3 and 4;

Fig. 5 is a plan view of Fig. 1;

Fig. 6 is a side elevation of Fig. 5;

Fig. 7 is a diagrammatic view of a side elevation of the second modification referred to;

Fig. 8 is a plan view of Fig. 7;

Fig. 9 is a front elevation of Fig. 7;

Fig. 10 shows the bars 56, 56ᵃ set up in accordance with the multiplicand digits 620179, as an example;

Fig. 11 is a side elevation of a variation of the modification illustrated in Fig. 7;

Fig. 12 is a front elevation of Fig. 11;

Fig. 13 shows several parts of Fig. 11 in plan view;

Fig. 14 is a side elevation of Fig. 11 after the machine has been in operation;

Fig. 15 is a diagrammatic plan view of a modification of the product members;

Fig. 16 is a side elevation of Fig. 15;

Fig. 17 is a side elevation of a machine constructed in accordance with this invention;

Fig. 18 is a plan view of Fig. 17 with some of the parts removed.

Fig. 19 is a front elevation of Fig. 17 with some of the parts removed; and

Figs. 20 and 21 illustrate the arrangement of the actuatng means on the product members to accord with the separate products of the digits 1–9 and the digits 1–9.

Figs. 22, 23, 24 and 25 are detail views.

The method of operation involved in the first mentioned modification, which is illustrated diagrammatically in Figs. 1–6, will now be described. The product members comprise any number of disks 10 in pairs, one disk of each pair carrying pins 11 arranged in nine sectors I–IX to represent the units of all the separate products of the digits 0–9 by the digits 1–9, the other disk of the pair carrying pins 11 also arranged in sectors I–IX but representing in this case the tens of all the separate partial products of the digits. There is one pair of such disks for each digit of the multiplicand, and any number of pairs may be provided. It will be understood that the units and tens may be represented in other well known suitable arrangements, if desired, whereby the number of disks employed for any number of multiplicand digits may be variously modified. For each pair of disks 10 there is provided a lever 13 and a bank of multiplicand keys 1–9, which may be independently depressed to position the respective lever 13 in accordance with a particular digit. The depression of the keys of each bank may be limited in the usual way to determine the position of the corresponding lever 13. Each lever is pivoted at one end, as shown, while the other end thereof is forked, whereby the pin 14 carried by one arm of the fork, is adapted to form an abutment for the pins 11 of the unit disk of a pair, while a similar pin 14 on the other arm of the fork is adapted to form an abutment for the pins 11 on the tens disk of that pair, the arrangement being such that the two pins 14 of each lever 13 always form abutments for those pins 11 which together represent a partial product. When none of the multiplicand keys 1–9 is depressed, then the corresponding pins 14 are adapted to engage the pins 11 in the circle 0 on the corresponding pair of disks 10. When a multiplicand key is depressed, the pins 14 of the corresponding lever 13 are positioned at a predetermined radial distance from the axis of the pair of disks, but not in the plane of the pins 11 until a subsequent operation has been performed, as will be noted later. In Fig. 1 the key 9 is shown depressed to set up a multiplicand digit 9, whereby both pins 14 carried by that lever 13 are at the same radial distance from the axis of the disks as the pins 11 in the circle marked 9 on the disks.

The shaft 12 shows as many pins $12^a$, as pairs of disks 10 are provided (Figs. 23, 24 and 25). Said pins are disposed in the same intervals from each other as the said pairs of disks. The hubs $13^a$ of the disks 10 possess at their inner side a turned annular ring $14^a$, wherein a pin $12^a$ has ample play. As may be seen in Fig. 23 the pin $12^a$ is loosely disposed in the ring $14^a$. In this position the hub $13^a$ as well as the pair of disks 10 may be turned around the shaft 12. As soon however as the shaft 12 is pushed somewhat to the left, without altering the position of the disks 10, the pin $12^a$ leaves said annular ring $14^a$ and enters into the groove $15^a$ provided along said shaft. This position of the elements is represented in Fig. 22. In order to secure the entrance of the pin into the said groove it is necessary that all the disks have one and the same position, that is, that all the grooves of the different disks are arranged in alinement. This will however make no difficulty, as the racks 15 are in engagement with the disks 10 at the displacement of the shaft. Only if a new multiplier is to be set, the racks 15 will be brought out of engagement with the notches of the disks 10 in consequence of the lowering of the whole guide arrangement 16 so that by means of these disks and the shaft 12 any one of the sectors may be able to bring a group of pins I–IX into engagement with the pins 14. At the left side end the shaft 12 carries the hand wheel $16^a$ which is provided with ten notches in a well known manner and when pulled to the left causes the pin $12^a$ of the shaft 12 to enter groove $15^a$ of the hub $13^a$ of the disks.

Referring to the diagrammatic views in Figs. 1 to 6, inclusive, the shaft 12, is movable longitudinally, such movement being accomplished by any well known means which it is not deemed necessary to illustrate herein.

In the normal position of shaft 12, the disks are individually rotatable thereon, but by shifting the shaft 12 longitudinally with respect to the disks, all of the disks are locked to the shaft by pin and slot connections. In this way, similar sectors of each pair of disks may be collectively turned to a predetermined position in accordance with a digit 1–9 of the multiplier, during which movement similar sectors of all the disks are opposite one another. The periphery of each disk 10 is toothed and is adapted to engage one of the racks 15, but the racks are held out of position of engagement during the set up. After the levers 13 and the disk 10 have been positioned and before the machine is operated to register the separate products of each multiplicand digit set up and the multiplier digit set up, the guide 39 by which the levers 13 are guided in their swinging movements, is moved longitudinally and by coöperative connections (not fully shown in these diagrammatic views) brings the pins 14 into the plane of the respective coöperating pins 11, the racks are moved by the guides 16 to engage the toothed periphery of the respective disks 10 and the shaft 12 is shifted longitudinally back to its position of disengagement to permit independent rotation of the disks. The parts are then held in those positions until the driving operation is completed, whereupon the parts return to their previously noted positions for multiplication of the same multiplicand digits by another multiplier digit, or for any other multiplication. During the driving operation to register the partial products on the counter, the shoe 17 is moved to the left upon the rod 18 by a hand-lever, clamp, or other suitable mechanism (not shown) and suitable friction couplings (not shown) between the outlying parts 19 and the racks 15, 15$^a$, etc., and the racks 20, 20$^b$, etc., (Fig. 5,) transmit this movement to all the racks, thereby turning each disk 10 in the direction of the arrow in Fig. 1, until the coöperating pin 14 in its predetermined radial position abuts against the pin 11 of the predetermined sector and in alinement therewith, whereupon that particular disk is stopped, although other disks may be turned through a lesser or a greater amount of rotation as a result of the friction couplings. Hence, upon completion of the driving operation, all the racks 15 have been driven to the left in accordance with the multiplicand digits and the multiplier digit set up. The rack 15 engaging the unit disk of a pair is straight, while the rack 20 engaging the tens disk of the pair of next lower denomination is bent vertically and longitudinally so as to actuate the same gear 21 which is mounted for movement between these two racks, thereby forming a differential gearing. Thus when the rack 15 is moved alone to the left to register the units of a partial product, the rack 22 is moved one-half that distance to the left, and similarly when the rack 20 is moved alone to the left to register the tens of the partial product of next lower denomination, the rack 22 is moved one-half that distance to the left. When both of these racks 15 and 20 are moved simultaneously, the rack 22 is moved one-half of the combined distance to register the sum of the units of the partial product of one denomination and the tens of the partial product of the next lower denomination. The dial 23 is adapted to engage the rack 22 and is numbered around its periphery to show the total units of movement of the racks 15 and 20. In the same way, the sum of the units of each other partial product and the tens of each partial product of next lower denomination is registered on a dial of proper denomination. Instead of effecting engagement with the dials 23 during the movement of the racks 22 to the left, any well known construction may be used by means of which the shoe 17 first moves all the racks 15 to their limits predetermined by the pins 14 and the coöperating pins 11, and then upon further movement to the left it engages all the racks 22 and the respective dials 23. The movement of the shoe is then reversed and as the member 19 abuts against the pins 24, all the racks 15 and 20 are moved back to their normal position, and thereby register upon the dials 23 of proper denomination the sum of the units of each partial product and the tens of the partial product of next lower denomination. The parts are then restored to their normal position in any suitable way for a subsequent operation. Suitable transfer devices between the dials for carrying units to the next higher denominations will be described later.

A modification of the differential gearing is shown in Figs. 3, 4, and 4$^a$, wherein the rack 25 is moved during the driving operation, just as before, until the coöperating pins 11 and 14 abut against each other. In this case, however, the racks 25 and 26 corresponding to 15 and 20, respectively, of Fig. 5, are both straight and they are brought into engagement with the gears 27 and 28 only when they move to the right, whereupon the gear 29 rigidly connected to 28 drives the planet gears 30, 33, which engage with the gears 29 and 31, respectively. The gears 29 and 30 are loosely mounted on the shaft 29$^a$ and the gears 30, 33 are fastened together and loosely mounted on a shaft 30$^a$ extending from the gear 27. The gear 31 is fastened to the gear 32 and both of them are loosely mounted on the shaft 29$^a$. In this way, the planet gear 30 is rolled bodily around the axis of shaft 29$^a$ on the gear 29 and is rotated axially when the unit racks 25 alone moves to the right, while the planet gear 30 is rotated axially around its shaft 30$^a$ in the same direction as the previous axial rotation when the tens rack 26 alone moves to the right. When both racks 25 and 26 move simultaneously, the planet gear 30 is rotated axially an amount proportional to the sum of the two movements, and hence the gears 31 and 32 are turned in proportion to the sum of the movements of both racks, or in proportion to the movement of either one alone. The ratio of transmission between the gears 27 and 32 or between 28 and 32 is one-half, but this ratio may be changed if desired, or reversed so that the gear 32 is turned at half the speed of rotation as the gears 27 or 28, as occurs in the differential gearing of Fig. 1. A gear 34 fastened to the dial 35 is meshed with the gear 32 and rotated thereby to indicate the sum of the units of one partial product and the tens of the partial product of next lower denomination, or of either one alone. The transfer devices between the dials may be of any suitable type such as those described hereinafter while the disks 10 may have other suitable forms well known in the art.

The mode of operation of the machine diagrammatically illustrated in Figs. 1–6 will now be described, assuming that any factor, as 896, is to be multiplied by any other factor, as 753. The multiplicand digits 8, 9 and 6 are set up on the hundreds, tens and unit banks of keys 1–9 in the well known way, thereupon setting the pins 14 to the eighth, ninth and sixth circles of the respective pairs of disks 10. The unit digit 3 of the multiplier is then set up by a hand-lever or key (not shown) by bringing the sector III of all the disks in predetermined relation with the pins 14, similar to the position of sector IX in Fig. 1. The racks 15, 20 are then moved into engagement with the respective disks 10, and the pins 14 are moved longitudinally into the planes of the pins 11 on respective disks 10, as previously described. The shoe 17 is then moved to the left and each rack 15, 20 is moved to the left. The corresponding disks 10 are rotated in the direction of the arrow in Fig. 1 until the pins 14 abut against the predetermined pins 11, each disk being rotated a lesser or a greater amount depending upon the corresponding set up.

At the end of the movement of the shoe 17 to the left the racks 22 in Fig. 1 or the racks 25, 26 in Fig. 4, are put into engagement to drive the corresponding dials 23 or 35. The movement of the shoe 17 is then reversed and each rack is moved to the right the same amount as it was previously moved to the left before it reaches its normal position. Hence, the rack of lowest denomination will move an amount proportional to the eight units of the product of 6×3 and will register 8 on the dial of lowest denomination. The next rack will move one unit corresponding to the tens of that product, 18, and this movement will be added by the differential gearing to the seven units of the product of 9×3, thereby registering 8 on the dial of that denomination. In this way, the partial result 2688 is obtained on the counter as will be understood by referring to Fig. 5 and the example below:

| | | | | | |
|---|---|---|---|---|---|
| Rack 15 registers | | | | 8 | } 6×3 |
| Rack 20 registers | | | 1 | | |
| Rack 15ᵃ registers | | | 7 | | } 9×3 |
| Rack 20ᵃ registers | | 2 | | | |
| Rack 15ᵇ registers | | 4 | | | } 8×3 |
| Rack 20ᵇ registers | 2 | | | | |
| | 2 | 6 | 8 | 8 | =896×3 |

At the end of this operation, the racks 15, 20 are moved out of engagement with the disks 10 and the pins 14 are moved out of the planes of the pins 11. The counter is then moved one denomination to effect indentation of the partial results in the well known way. The levers 13 are retained by any suitable well known means in their set position and the disks are all turned to position their sectors V in accordance with the next digit 5 of the multiplier 753. The operation is then repeated as before and the partial result 4480 is added on the counter in the proper denominational relation to the previous partial result 2688. Finally, the multiplicand is multiplied by the digit 7 of the multiplier in the same way and the partial result 6272 is added on the counter in proper denominational relation to the previous sum. The final result may be indicated as follows:

$$2688 = 896 \times 3$$
$$4480 = 896 \times 5$$
$$6272 = 876 \times 7$$
$$\overline{674688 = 896 \times 753}$$

It will be noted that the construction disclosed above provides means for simultaneously registering in proper denominational relation the units and the tens of the various partial products. So far as I am aware, this feature is broadly new and therefore, my claims in connection therewith should be broadly interpreted.

A modified type of product members is shown in front elevation in Fig. 15 and in side elevation in Fig. 16 in the form of superposed plates 51, each having two identical ends representing in toothed outline the units or tens of all the products of the digits 0–9 and one digit of the series 1–9. The unit plates are shown on the left of Fig. 16 and the tens on the right, and in Fig. 15 the full lines show the plate representing the units of the products of all the multiplicand digits 0–9 by the multiplier digit 7, while the broken lines show the corresponding plate representing the tens of those products. Fig. 16 is a section taken through the plates where there is represented the products of the multiplicand digit 6 and of the multiplier digits 1–9, which corresponds to the position of the cross-bars 53, 54 in Fig. 15. In order to produce a movement of parallel translation of each of the separate plates 51, the actuator has the form of the letter H in plan view, comprising the cross-bar 52 and the uprights 53 and 54 which engage corresponding parts of the two ends of the plates, while the cross-bar is adapted to pass through the opening indicated at 0 in Fig. 16. The member 52 is shifted to the right or left in Fig. 15 in any suitable way in accordance with a multiplier digit, as indicated by the broken lines, while each pair of rods 56, 56ᵃ is positioned to the right or left in Fig. 16 in any suitable way in accordance with a multiplicand digit. The member 52 is given a movement of parallel translation in the direction of the arrow in Fig. 15, for instance in substantially the manner described in connection with Figs. 18 and 19, whereupon all of the plates 51 will be moved in the same direction, each unit plate and each tens plate being moved a distance corresponding to the height of the predetermined projection thereof, whereupon the unit rods 56 and the tens rods 56ᵃ would be moved in the same direction by amounts representing the digits of the required partial products. In this way, all the digits of the multiplicand are set up first and then after each digit of the multiplier is set up, the plates 51 are moved as described, the counter being shifted each time in denomination to effect indentation. This latter operation and the transmitting connections to the counter will be understood from the description of Figs. 7–10 which appears later.

All the modifications described above require a driving operation of the disks 10 or the plates 51 after each digit of the multiplier is set up, whereas, in the modification described hereinafter no subsequent driving operation is necessary, the product being shown on the counter as soon as the two factors to be multiplied together are completely set up.

In accordance with the second modification within my invention, there are product members in the form of 9 plates I–IX, wherein each plate has actuating means in the form of stepped projections representing the units and tens of all the digits 0–9 and one multiplier digit, the plate for the multiplier digit 7 being shown in side elevation in Fig. 7. The back of each product member forms one side of a quadrilateral link while another side is prolonged to form an operating lever 57 carrying an operating key or handle 58. By moving the handle 58 to the position 58ᵃ in Fig. 7, the product member VII is moved in parallel translation through the distance $a$ corresponding to the sum of the length of step 9 and the distance $b$. The purpose of the movement $b$ will be explained later. In order to reduce the friction resulting from the downward component of the pressure, each plate I–IX is provided with a bottom rail 59 resting upon the roller 60. The superposed cross-bars 61, 61ᵃ extend along the front of all the plates in alinement with the steps, there being 9 plates 61 for the units and 8 plates 61ᵃ for the tens of the partial products, together with a blank space representing 0 between the two series. Upon actuation of a lever 57 these cross-bars are individually guided in parallel movements. When a product member is moved forward to its extreme position by the lever 57, the cross-bars 61, 61ᵃ are moved forward, or to the left in Fig. 7, through different amounts and they will assume relative positions in accordance with the stepped projections of the units and tens represented on that particular product member which is actuated. Although the resistance to movement increases as an increasing number of cross-bars are moved, the force required at the handle 58 will be equalized by the quadrilateral link whose effect increases with the angle $c$. Each of the nine product members is provided with a quadrilateral link and a handle 58, whereby anyone of the product members may be operated at a time, the others being retained in normal position at that time.

There is a bank of keys 1–9 (Fig. 7) for each digit of the multiplicand and as many digits as desired may be provided for. Each bank of keys controls the position of a pair of rods 56, 56ᵃ, which are spaced apart vertically to correspond with the separation of the corresponding units and tens on the product members. The rods slide forward and back through the sleeves 62, 62ᵃ, which are carried by the sleeve 63 so as to be moved on the rod 64 by the link 65 in accordance with the position of the levers 66 and 68 which are connected together by a link 67 and moved by any one of the multiplicand keys 1–9. For instance, if the key 7 is depressed, as shown in Fig. 7, the rod 56 is moved opposite that cross-bar 61 which is in alinement with the units projection 7, while the rod 56ᵃ is simultaneously moved opposite that cross-bar 61ᵃ which is in alinement with the tens projection 7 of all the product members I–IX. The tens rod 56ᵃ is in the vertical plane of the units rod 56 of next higher denomination so as to actuate therewith the same gear 70 as in the previously described arrangement of Figs. 1–6. The racks 69, 69ᵃ have a vertically extending part 71, 71ᵃ to engage the respective rods 56, 56ᵃ in whatever position the rods may be set. In order to show in a straight line through the apertures 77 the multiplicand digits set up by the keys 1–9, each lever 68 carries at its free end a toothed segment 74 meshed with a gear 75 on the dial 76.

Fig. 10 shows the rods 56, 56ᵃ set up, for example, in accordance with the multiplicand 620179 which would then show through the apertures 77. If now one of the product members I–IX is actuated by a handle 58, all the cross-bars 61, 61ᵃ are moved and predetermined ones thereof move the rods 56, 56ᵃ by amounts corresponding in each case to the units or the tens of a separate product of a multiplicand digit and the multiplier digit selected. The tens of the partial product of one denomination and the units of the partial product of the next higher denomination are added by the three components of the differential gearing 69, 69ᵃ, 70, and the sum is registered on the dial 73. To multiply by a second digit of the multiplier, the counter is indented one denomination and the handle 58 corresponding to that digit is actuated as before to add to the first partial result registered on the counter the product of the multiplicand 620179 and the second multiplier digit. This operation may be repeated for any number of multiplier digits.

The following arrangement is provided to eliminate the effect of inertia which might arise as the result of the comparatively short stroke of the handle 58. When a handle 58 is just started in its movement, the rail 59 of each product member I–IX immediately abuts the cross-bar 78 and the tail 83 of the spring-pressed pawl 81 is moved away from the stationary pin 82, the cross-bar 78 thus being gripped by the head of the pawl. Upon further movement of the product member, the racks 79, 79$^a$ turn the gears 80, 80$^a$ and the toothed roller 84 in the direction of the arrow in Fig. 7. This action occurs while a product member I–IX is being moved through the distance $b$, and therefore, before the cross-bars 61, 61$^a$ are moved at all. Each rack 69$^a$ also has teeth on its bottom and each rack 69 carries a rack 85 suspended from it by the pieces 86. Both of these racks engage the toothed roller 84 after it has been rotated one tooth by the gears 80, 80$^a$. In this way, all of the differential gearings are locked in position as soon as they commence to move so that overthrow is prevented. If desired, the racks 79, 79$^a$ may lie in the plane of the racks 69$^a$ and engage the toothed roller 84 as before without the interposition of gears 80, 80$^a$. Upon the reverse movement of the product member I–IX, the toothed roller 84 returns the parts to their normal positions and disengages the dials 73 by any suitable means.

Another modification within my invention is shown in Figs. 11–14 and 17–19, wherein the side 87 of each quadrilateral link operated by the handle 58 is fastened to the nine bars 88 of equal length and carries a base rail 59 adapted to roll on the roller 60. The product members have the form of superposed plates of sheet metal extending across the machine, there being nine plates 89 for the units of the partial products and eight plates 89$^a$ for the tens. Each of the plates is guided in a movement of parallel translation when operated by any quadrilateral link as a result of the guide rails 93 fastened thereto and running on the balls 94 at the two sides of the machine. The plates 89, 89$^a$ are bent over at their front edge to form a sufficiently wide abutment for the rods 56, 56$^a$, and each is provided with pins or projections 91, 92 (Figs. 11, 13, 20 and 21) representing the units or tens of the separate products of the digits 1–9 and the digits 1–9. The projections of adjacent plates are arranged so that they extend to the same horizontal planes and those projections of adjacent plates representing digits of the partial products for the same multiplier digit are both in the path of the same arm 88, so that upon movement of any one handle 58 the nine bars 88 extend between the pairs of plates and move all of the plates through amounts corresponding to the position of the projections. However, in order that the two projections 91, 92 engaged by the same arm 88 do not interfere during movement, the projections are offset somewhat across the machine, as indicated in Fig. 13. As in the modification described in connection with Figs. 7–10, each pair of rods 56, 56$^a$ is positioned vertically by depressing one of the keys 1–9 in accordance with a digit of the multiplicand so that they will be actuated by a predetermined unit plate 89 and a predetermined tens plate 89$^a$ when any one of the handles 88 is operated. Fig. 14 shows the product member VII moved to its extreme actuating position, the pins 91, 92 engaged by the arms 88 then lying in one vertical line and the predetermined rods 56, 56$^a$ being moved different amounts by the product plates in accordance with the units or tens of the partial products represented by the projections 91, 92. The rails 95, 95$^a$ are guided in straight movements in any suitable way. Each rail 95 carries a piece 96 extending in the path of travel of a rod 56, while each rail 95$^a$ carries a similar piece 97 for a rod 56$^a$, the two pieces being in the same vertical plane as shown in Fig. 12. A lever 98 has a slot 99 at each end and is pivoted to the unit rail 95 of one denomination by a pin 100 and to the tens rail of the next lower denomination by a pin 100$^a$, excepting the lever 98 of lowest denomination which is pivoted to its unit rail at one end but pivoted to the frame of the machine by the pin 91 at its lower end since no tens can be transmitted by this lever. One of the three levers shown in Fig. 14 has been moved only by a unit rod, 56, another has been moved only by a tens rod 56$^a$, and the third which is shown at the extreme left, has been moved by both a unit rod and a tens rod. A rack 72 is pivoted to each lever 98 and transmits to a dial of the counter an amount of movement proportional to the two movements imparted to the ends of the lever by the rails 95 and 95$^a$. In Fig. 14, the multiplicand 76 is set up by the rods 56, 56$^a$, and the product plates have been moved by the arm VII corresponding to the multiplier digit 7, so that the levers 98 have been swung about their pivots 100, 100$^a$ in accordance with the units and tens of the separate products of the multiplicand digits and the multiplier digit. The unit rail 95 of lowest denomination has been moved an amount 2, and the tens rail 95$^a$ has been moved by the rod 56$^a$ of the same pair, an amount 4, while the next unit rail has been moved by the rod 56 of another pair an amount 9 and the next tens rail has been moved by the rod 56 of the latter pair an amount 4. The projections 91, 92 are so arranged that one of the numbers bearing the arms 88 shows a multiplier digit 7 in a vertical plane while in a horizontal plane the units and tens plates 89, 89ª show the multiplicand digits. The distances through which the unit rails 95 and the tens rails 95ª move are shown by the scales at the right-hand end of Fig. 14. The distances through which the racks 72 move may be noted from the small scale at the bottom and left of Fig. 14, showing 2 for the racks 72, of lowest denomination, 13 for the rack of next higher denomination, and 4 for the rack of highest denomination, in accordance with the following partial products of the two factors 76, and 77, the 1 of the sum 13 being carried over to the next higher denomination by transfer devices between the dials, as will be explained later, thereby giving the correct product 532:

$$\begin{array}{r} 4\;2 \\ 4\;9 \\ \hline 4_13\;2 \end{array}$$

The same means as previously described in connection with Figs. 7–10 may be used to prevent overthrow of the movable parts.

Fig. 17 shows a side view of the calculating machine with its side casing removed to expose the internal working parts of one denomination, while the counter is shown in section between 2 dials. Figs. 18 and 19 show a machine with a capacity of 9 multiplicand digits and 18 result dials which is suitable for the multiplication of any two factors wherein each has nine digits or less, although this capacity may be modified as desired. The parts, excepting the product members, are similar for each of the denominations. In Figs. 18 and 19, the multiplicand keyboard and the counter are removed together with some of the operating and transmitting mechanism.

The multiplicand keyboard comprises nine banks of 0–9 keys 102 sliding through the transverse members 146, 147 fastened to the longitudinal supports 149, 150 which are secured to the frame of the machine. Each bank of keys is provided with two pivoted levers 66, 68 connected together by the link 67, the lever 66 being used to secure the proper movement of the segment 74 to set up the multiplicand indicating dials 76 when any key 102 of that bank is depressed. Each key carries a pin 104 adapted to depress both levers 66 and 68 through an angle depending upon the position of the key in the bank. Hence, the pair of rods 56, 56ª will be positioned in accordance with the particular key of the bank depressed in consequence of the link 65 connecting the lever 66 with the support 63 which slides on a vertical rod 64. The rods 56, 56ª are held in position opposite the predetermined product plate 89, 89ª by a spring plate 105 (Fig. 19) extending along the keys of each bank in engagement with an indentation on each key shank. By this means any key is held fast in depressed position, but when another key of the same bank is depressed, the first key is pulled up to its raised position by the spring 106 while the last key depressed is then held down in position by the spring plate 105. The dials 76 expose in a straight line through the apertures 77 the multiplicand digits set up by the keys. To multiply any multiplicand set up on the keys 102 by any multiplier digit, the lever 57 corresponding to that digit is actuated in the direction of the arrow of Fig. 17. The corresponding member 87 carrying the arms 88 and the foot 108 is moved thereby to the left and as soon as the spring pawl 110 is allowed to be forced down from the raised position, in which it is held by the bar 107 extending across the machine for all the members 87, the indentation 112 of the bar 109 is engaged by the pawl and the depending piece 111 of the foot 108 rolls the rails 79 on the roller 60. As soon as the pin 114 mounted on the rail 79 has been moved a small distance, the bar 113, which extends across the machine is forced upward by springs and comes in front of the depending piece 111 of each of the other members 87 to thereby prevent any other lever 57 from being operated until the one then being operated is fully restored to its normal position.

The movement of the product members 89, 89ª and the rods 56, 56ª has already been described in connection with Figs. 11–14. The stationary guide 151 for the lowermost arm 88 and the guiding slot 152 for the lever 57 insures parallel translation of all the arms of that group. The arrangement of the projections on each of the product members 89, 89ª is illustrated in Figs. 20 and 21. Fig. 20 indicates the position of the projections 91, 92 on all the plates in the nine vertical sections corresponding to the nine members 88, the projections being represented however, on the bottom of the plates instead of alternately on the bottom and the top thereof, as in Figs. 11–14 and 17, and the tens plate being illustrated on the side of the units plates instead of below. Fig. 21 shows the arrangement of the projections of each of the plates 89, 89ª. It will be understood from the preceding description that the rods 56, 56ª are positioned vertically with respect to Fig. 20 in accordance with the separate digits of the multiplicand, while the multiplier digit set up at any time determines the projections in the vertical lines in Fig. 21 engaged by the arms 88.

Each of the product members 89, 89ª is fastened at both ends to rails 93 which roll on balls 94 set in grooves in the rails 93 and in the uprights 179 and the bars 180. The bars 180 are journaled in the uprights 181 fastened to the frame of the machine. The differential gearing of Figs. 1 and 7 is shown in Figs. 17-19, instead of the pivoted lever arrangement of Figs. 11-14, and the method of operation has already been described in connection with Figs. 1 and 7. The rods 56 and 56ᵃ act against the upright members 116 and 116ᵃ respectively, each forming a right-angle with the rails 117 or 117ᵃ which roll on balls 118 mounted in grooves in the rails and the plates 119 and 120, while the plates 119 and 120 are fastened to the upright supports 121 and 122, so that the bars 116, 116ᵃ are moved in straight parallel lines by the rods 56, 56ᵃ. A rack 69 is fastened to each unit bar 116 and a rack 69ᵃ is fastened to each tens rail 117. The unit rack 69 and the tens rack 69ᵃ of next lower denomination form a differential gearing with the gear 70, which is therefore actuated by either one at a time or by both of them together, thereby registering the separate totals of the digits of the partial products in proper denominational relation on the counter by means of the racks 72 and the gears actuating the dials. Since units only are registered on the dial of lowest denomination engaged by the racks, the tens rack 135 of lowest denomination is fastened to the frame of the machine, and similarly in the case of the unit rack 136 of the highest denomination.

The racks 72 connected to the gears 70 are moved forward during the movement of any lever 57 and are then returned. The following arrangement is provided to prevent the backward rotation of the dials when the racks 72 are being restored to their normal positions after their forward movement. The rails 79 extending transversely of the machine on the two sides thereof are toothed at their forward ends and are secured to the cross-bar 109 which is moved forward and back by any one of the bars 87 upon actuation of a lever 57. The toothed portions of the rails 79 mesh with the gears on the shaft 134, turning it and at the same time insuring parallel translation of the cross-bar 109. There is a lever 138 pivoted at 137 for each rack 72, and this lever carries a roller 139 and an arm 140 which is provided with a pin 141 adapted to run on the periphery of a disk 142 and into the recess thereof when the lever 57 is not being pulled forward. When the lever 57 is pulled forward all the disks 142 rotate and the incline of the recesses lift the respective levers 138 and also raise the racks 72 into engagement with the respective gears 127 until the disks 142 have been turned around, whereupon the pins 141 again run into the recesses and thereby cause the racks 72 to disengage the gears 127. The disks 142 are connected to the shaft 134 by locking pawls arranged to drive the disks upon forward movement of the racks but not to drive the disks upon the reverse movement. The locking pawls may be so arranged that a spring-pressed pin 144 enters a slot in the gear and rotates the disk 142 during the forward movement, but on the reverse movement, the pin 144 slides out of engagement with the gear. A single acting pawl of this kind may be made in many suitable ways. In order that the racks 72 shall not engage the gears 127 at the beginning of the actuation, the arms 88 move the distance $b$, (Fig. 17) before the product plates 89, 89ᵃ can be moved at all. However, in the period of this movement $b$ the rails 79 turn the shaft 134 sufficiently to engage the racks 72 and gears 127. The two springs 145 produce the return-movement of all the parts, including the operating levers 57.

The transfer of units to the dials of next higher denominations is performed during the return-movement of the racks, the complete transfer operation being divided into two periods. While the preliminary setting operation of the transfer devices may occur during the forward movement as well as during the return movement, the actual carrying to the next dials takes place on the return movement when the racks 72 are disengaged from the gears 127. When any dial 128 is passing from 9-0 or from 0-9, a pin 153 for that dial forces back the coöperating pivoted lever 154, and the uppermost indentation of the lever 154 moves away from the pin 155 on the arm of the cover-plate 132 while the pin 156 on the same arm is being engaged in the opposite indentation of the lever 154. This latter indentation is of less depth than the one engaged by the pin 155 so that the spring-pressed arm of the plate 132 moves down slightly during the movement of the lever 154. When the gear 129 and also the dial 128 have turned one-tenth of a rotation, the pin 153 lies on the other side of lever 154 which then moves back to the position shown and releases the pin 156 but reëngages the pin 155 in the central indentation. In this way, the cover-plate 132 lying flat against the gear 127, exposes one tooth thereof. The indentation on the left of lever 154 together with the pin 156 prevent the cover-plate 132 from exposing more than one tooth, similar to a watch escapement, and this occurs during the forward movement of the racks 72. During the return movement of the racks 72 and rails 79, the shaft 161 is rotated by the gears 170, 171, 172 and 173 (Fig. 18) the rotation being effected by a single acting locking pawl 200 on the shaft 161 so arranged that the shaft 134 rotates the shaft 161 in only one direction. The rotation of shaft 161 is transmitted to the shaft 158 in the direction of the arrow in Fig. 17 by the gear 169. The pins 159 are angularly displaced around the shaft 158 and along its length to successively actuate the dials from the lowest to the highest denomination for the well known reason of properly effecting the transfer of units. The levers 162 are forced back in turn by the pins 159 thereby causing the pivoted pawls 163 to slide over the edge of the cover-plates 132 and causing the finger 164 of the lever 162 to engage the teeth of the gear 165 which are similar to the teeth of the adjacent gear 127, both of these gears being fastened together. If a cover-plate 132 had previously been moved in consequence of the fact that the corresponding dial had passed from 0 to 9 or 9 to 0, then the actuation of lever 162 would cause the pawl 163 to slide around the periphery of the cover-plate to engage the teeth exposed thereon and rotate the gear 127 and the dial of next higher denomination through one digit in the proper direction. At the end of the movement of lever 162, the finger 164 engages the gear 165 and holds it against further rotation, thereby preventing overthrow of the transfer movement. The lever 162 is restored to normal position by a spring, as shown, while the cover-plate 132 is restored by the subsequent engagement of the same pin 159 with the end of its projecting arm.

It has already been explained that each rack 72, excepting the ones of highest and lowest denominations, register the sum of the units of one partial product and the tens of the partial product of next lower denomination. This sum may amount to as much as 17 while the dial on which the sum is registered may already indicate as much as 9. Therefore, it may be necessary in some cases to transfer two units to the dial of next higher denomination after the complete forward movement of a rack 72. In all other machines of which I am aware, only one unit has ever to be transferred at a time. In order to be capable of transferring two units after each forward movement of the racks 72, an extra indentation is provided on each side of the lever 154. As previously described, for the transfer of one unit, the pin 155 is depressed one step, whereupon the cover-plate 132 exposes one tooth of the gear 127. Similarly, when the pin 153 again engages the lever 154 the pin is depressed another step and the cover-plate 132 then exposes a second tooth, so that during the return movement of the racks 72, the gear 127 and therefore the dial of next higher denomination is advanced two units in the proper direction. The arrangement of the levers 162 provides for the movement of gears 127 through this amount. The spring-pressed levers 166 are adapted to position the dials 128 and to prevent any unintentional movement thereof.

The intermediate gears 130 are provided for the purpose of reversing the direction of rotation of the dials 128 for performing subtraction or division with this machine. The arrangement is such that the gears 130 come into engagement with the gears 127 as the gears 131 are being moved longitudinally out of engagement and vice versa, so that the gear 127 is never disengaged.

In order to multiply any multiplicand by a factor having more than one digit, the counter is moved longitudinally with respect to the racks 72 to effect indentation of the partial results. The counter mechanism is mounted on balls 167, 168 running in grooves, as shown. In order that the shaft 161 may rotate the shaft 158 for all longitudinal positions of the counter mechanism, the gear 160 slides in a keyway (Fig. 18). The gear 169 is supported in a fixed position from the frame of the movable counter mechanism and it extends between the two disks carried by the gear 160 to move this gear along the shaft 161 as the counter is shifted to effect indentation. The gear 169 engages the gear 174 to drive the shaft 158 for all positions of the counter mechanism as a result of the return movement of the rails 79.

The dials of the multiplier set up by the handles 58 are indicated on the dials 175 through the apertures 177. These dials may be positioned in any suitable way.

The plate 90 carries the rail 175$^b$ forming a rack at its left end part, said rail engages the interposed wheel 175$^a$ whereby the dial 175 is driven. As the plate representing the "I" (Figs. 20 and 21) has its pins arranged in such a manner that at the actuating of the multiplier-lever I the said plate moves about one step, at II about two steps, at III to IX about three to nine steps, the said values being registered on the dial 175 by means of the rack 175$^b$.

This machine is adapted to perform multiplication, addition, division and subtraction. The mode of operation for performing multiplication has been previously described in connection with the several parts of the machine, but is now briefly repeated in connection with Figs. 17, 18 and 19. The gears 129 are engaged with the gears 127 and the gears 130 are disengaged therewith in order that the partial results will be added on the dials instead of being subtracted. The multiplicand digits are set up in the different banks 0–9 by the keys 102, and the multiplier digits are set up by the lever 57, whereupon the final product is obtained as soon as the factors are completely set up. The multiplicand is shown on the dials 75, the multiplier on the dials 175 and the product on the dials 128, from which the factors and the product may be printed by any suitable means, if desired. To multiply 49678 by 6703, the multiplicand is first set up in the proper denominational order, whereupon the various pairs of rods 56, 56ª are positioned opposite the predetermined product plates 89, 89ª in accordance with the separate digits 4, 9, 6, 7 and 8. The multiplier digits 6, 7, 0 and 3 may be set up in order from lowest to highest denomination or in the reverse order. If the multiplier is set up from the lowest to the highest denomination, the lever 57 for the digit 3 is first actuated and the partial result 149,034 appears on the dials 128, as soon as the lever returns to its normal position, and the counter is moved one denomination to the right by any well known suitable mechanism (not shown). The multiplicand digits however, remain in their set position. The lever 57 for the digit 0 is then operated, with the result that the counter is moved one denomination to the right but without adding anything to the dials 128. The lever 57 for the digit 7 is then actuated and this partial result is added in proper denominational relation to the previous result on the dials 128 thereby showing at the end of this operation 34,923,634, which is the sum of all the partial results so far obtained. The counter is moved one denomination to the right and after the lever 57 which was last operated is returned to its normal position the lever 57 for the digit 6 is operated as before, and the final product 332,991,634 then appears on the dials 128.

Any suitable means may be used for resetting to zero the result dials 128 and the multiplier indicating dials 175.

Having thus described my invention, what I claim is:

1. In a calculating machine, product members on which the separate digits of partial products are represented, a counter comprising a plurality of denominations, and a differential connection comprising a member adapted to be actuated by a product member in accordance with the units of a partial product of one denomination, a second member adapted to be actuated at the same time as the first mentioned member in accordance with the tens of the partial product of next lower denomination, and a third member for registering on a denomination of said counter the sum of said units and tens.

2. In a calculating machine, a plurality of product members on which are represented the units and tens of partial products, a plurality of pairs of devices adapted to be positioned relatively to said members in accordance with the digits of a multiplicand, a member adapted to be actuated by one of said devices in accordance with the units of a partial product of one denomination, a member adapted to be actuated by another of said devices in accordance with the tens of the partial product of next lower denomination, and means for adding said units and tens and for registering their sum on a denomination of said counter.

3. In a calculating machine, a plurality of product members, a counter, transmitting connections intermediate said product members and said counter, a plurality of devices adapted to be positioned relatively to said product members in accordance with the digits of a multiplicand, a plurality of banks of keys, and a plurality of levers operated by the keys of individual banks to position said devices and to position dials to indicate the multiplicand digits set up by said keys.

4. In a calculating machine, a plurality of movable members, a counter, a plurality of transmitting connections actuated in increasing number by said members to register on said counter, and a link for moving said members and for equalizing the increasing resistance to movement.

5. In a calculating machine, a pair of disks for each multiplicand digit wherein a disk of each pair is provided with projections arranged in nine groups representing the units of separate partial products and wherein the other disk of each pair is provided with projections representing the tens of partial products, a plurality of levers each provided with an abutment for the unit projections of a disk and an abutment for the tens projections of a disk, a counter, means for positioning each of said levers in accordance with a digit of the multiplicand, means for actuating said disks whereby the separate movements thereof are proportional to the separate digits of the predetermined partial products, and means for registering said partial products in proper denominational relation on said counter.

6. In a calculating machine, product members having actuating means representing the separate digits of partial products, a counter comprising a plurality of denominations, and a plurality of transmitting connections from said members to said counter, each of said connections embodying means for adding the units of a partial product of one denomination to the tens of the partial product of next lower denomination.

7. In a calculating machine, a plurality of product members having actuating means representing the separate digits of partial products, a counter comprising a plurality of denominations, transmitting connections between said product members and different denominations of said counter, setting means for positioning said transmitting connections in coöperative engagement with said product members in accordance with the separate digits of a multiplicand, and operating devices for actuating said product members in accordance with a digit of the multiplier, each of said transmitting connections comprising a member adapted to be actuated by a product member in accordance with the units of a partial product of one denomination, a second member adapted to be actuated by a product member in accordance with the tens of the partial product of next lower denomination, and a third member for registering on a denomination of said counter the sum of said units and tens.

8. In a calculating machine, a counter, transmitting connections adapted to advance said counter, product members adapted to actuate said transmitting connections, and operating mechanism for said product members comprising a plurality of links arranged to effect a movement of parallel translation.

9. In a calculating machine, a counter, transmitting connections adapted to advance said counter, product members adapted to actuate said transmitting connections, and operating mechanism comprising arms adapted to engage said product members and a plurality of links arranged to effect parallel translation of said arms.

10. In a calculating machine, a counter, transmitting connections adapted to advance said counter, product members adapted to actuate said transmitting connections, and a quadrilateral link adapted to effect a movement of parallel translation and to eqaulize a gradually increasing resistance to movement.

11. In a calculating machine, a counter, transmitting connections adapted to advance said counter, product members adapted to actuate said transmitting connections, operating mechanism for said product members, and means for effecting parallel translation of said product members during movement thereof.

12. In a calculating machine, a counter, transmitting connections adapted to advance said counter, product members for actuating said transmitting connections, a plurality of operating devices adapted to individually operate said product members, and means effective upon the actuation of any one of said operating members for locking the remaining ones thereof until the one being actuated is returned to normal position.

13. In a calculating machine, the combination of a plurality of keys, a plurality of bars, each of said keys being movable and being arranged to actuate a plurality of said bars when so moved, selecting mechanism movable into coaction with various ones of said bars so as to be actuated thereby and number-wheels driven by said selecting mechanism, substantially as set forth.

14. In a calculating machine, the combination of a plurality of movable keys, a plurality of bars, each of said keys being arranged to operate a plurality of said bars different amounts when the key is moved, selecting mechanism coöperating with said bars, setting means for positioning said selecting mechanism and number-wheels actuated by said selecting mechanism, substantially as set forth.

15. In a calculating machine, the combination of a plurality of keys, a plurality of bars, each of said keys being movable and being arranged to actuate a plurality of said bars when so moved, selecting mechanism movable into coaction with various ones of said bars, a movable carriage on which the selecting mechanism is mounted, and number-wheels actuated by said selecting mechanism, substantially as set forth.

In testimony whereof, I affix my signature, in presence of two witnesses.

CHRISTEL HAMANN.

Witnesses:
HENRY HASPER,
WOLDEMAR HAUPT.

Copies of this patent may be obtained for five cents each, by addressing the "Commissioner of Patents, Washington, D. C."